Jan. 27, 1959
C. HUDKINS ET AL
2,870,506
SAFETY STOP BLOCK
Filed May 31, 1957
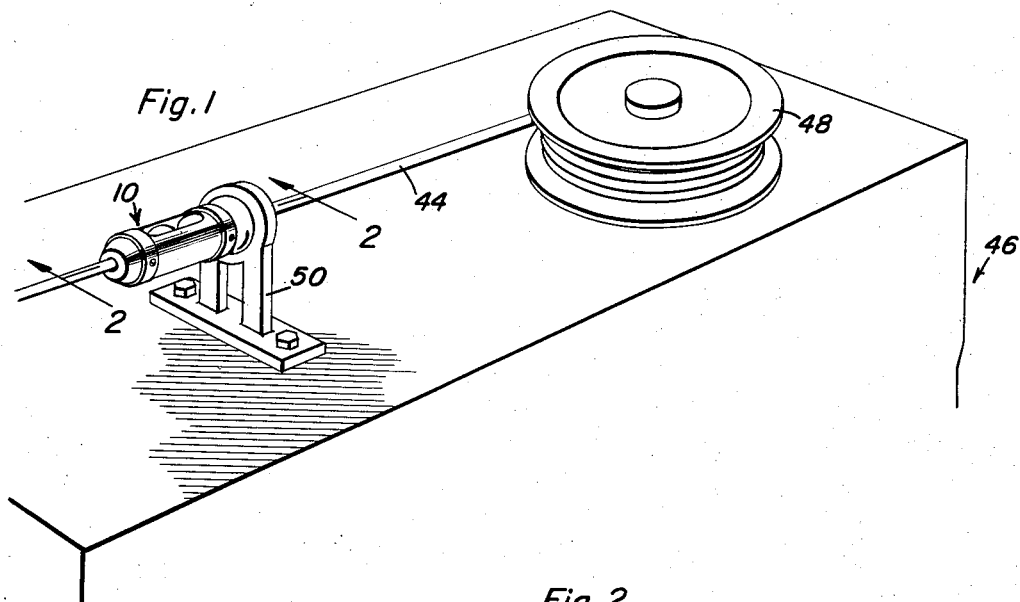
Fig. 1
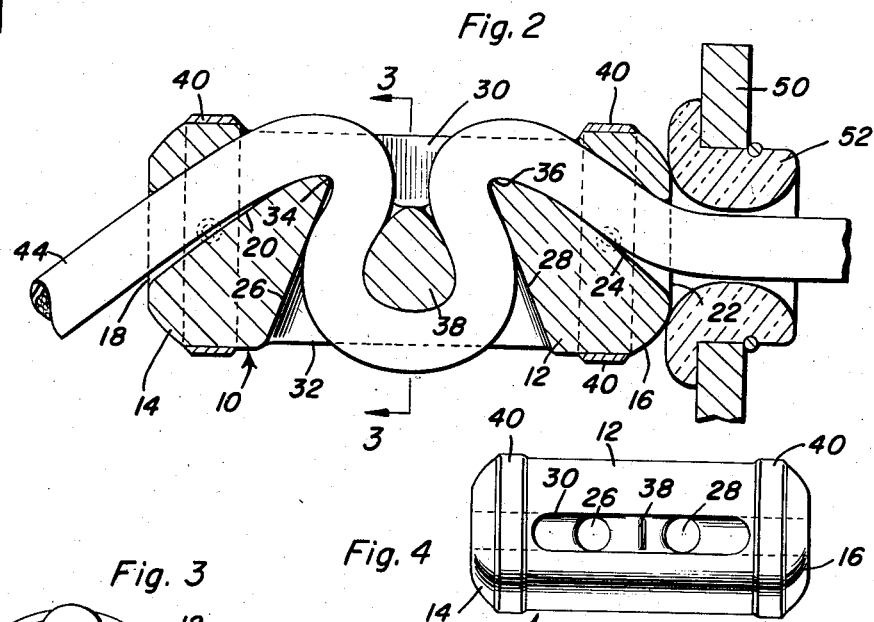
Fig. 2
Fig. 3
Fig. 4
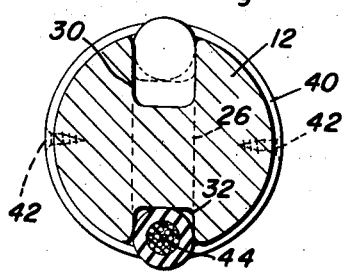
Clyde Hudkins
Ray R. Moore
INVENTORS,
BY 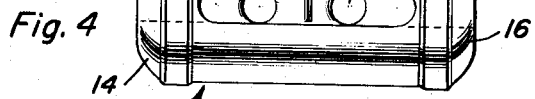
Attorneys

United States Patent Office 2,870,506
Patented Jan. 27, 1959

2,870,506

SAFETY STOP BLOCK

Clyde Hudkins, Glen Dale Heights, and Ray R. Moore, Moundsville, W. Va.

Application May 31, 1957, Serial No. 662,937

5 Claims. (Cl. 24—129)

This invention relates in general to new and useful improvements in attachments for electrical cables, ropes, etc., and more specifically to an improved stop block.

In numerous instances there are needs for stop members on electrical cables, ropes and the like, which stop member must abut another member and which must be of such a construction whereby it may be adjustably positioned on an electrical cable, rope or the like. A typical instance is in conjunction with a mine locomotive or motorized mine car which has an electric feed cable for the motor thereof. The feed cable is normally reeled upon either a spring type return reel or an electric motor driven reel which has a relatively great tension. The opposite end of the electrical cable is provided with an attachment for connection to an overhead power source. Because of the tension on the electrical cable, it is virtually impossible for the operator of the mine car to overcome the tension on the electrical cable and make the necessary attachment to the overhead wire. As a result, the operator normally ties a knot or makes other provisions for retaining slack in the electrical cable so that he may conveniently attach the end thereof to the overhead wire. Because of the closeness of the other components of the mine car, the knot oftentimes comes in engagement with a protective plate on the mine car and as a result the cable at the knot is stripped of its insulation by the plate and a short circuit results.

It is therefore the primary object of this invention to provide an improved stop block which may be conveniently positioned on electrical cables, ropes and the like, which stop block is adjustable longitudinally of the electrical cable and the like, and at the same time when positioned on the electrical cable firmly grips the electrical cable so as to prevent relative movement between the stop block and the electrical cable and the like.

Another object of this invention is to provide an improved stop block for electrical cables and the like, the stop block being of such a construction whereby the electrical cable may be conveniently fed therethrough and at the same time is so constructed whereby when the slack is taken out of the electrical cable within the stop block, the stop block is fixedly anchored on the electrical cable.

A further object of this invention is to provide an improved stop block for electrical cables, rope and the like, the stop block being of a construction whereby a cable, rope or the like passed therethrough is anchored within the stop block, the stop block being of a construction so that when two smaller ropes or cables are placed therein, it will form a splice therebetween.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Fig. 1 is a fragmentary schematic perspective view of a mine car and shows an electrical cable thereof provided with the stop block which is the subject of this invention;

Figure 2 is an enlarged fragmentary longitudinal sectional view taken substantially upon the plane indicated by the section line 2—2 of Figure 1 and shows the internal construction of the stop block and the relationship of the electrical cable therewith;

Figure 3 is an enlarged fragmentary transverse vertical sectional view taken substantially upon the plane indicated by the section line 3—3 of Figure 2; and Figure 4 is an enlarged fragmentary top plan view of the stop block as it appears with the cable removed therefrom.

Referring now to the drawings in detail, it will be seen that there is illustrated the stop block which is the subject of this invention, the stop block being referred to in general by the reference numeral 10. The stop block 10 is in the form of an elongated block member 12 which is circular in cross section and which has rounded ends 14 and 16.

The end 14 is provided with an enlarged entrance opening 18 which is centrally located. Extending inwardly from the entrance opening 18 is an end passage 20. The end passage 20 lies in a longitudinal plane passed through the center of the block member 12 and opens through the periphery of the block member 12 intermediate the ends thereof. A centrally located entrance opening 22 is formed in the end 16. The entrance opening 22 is identical with the entrance opening 18 and there extends from the entrance opening 22 an end passage 24 which lies in the same plane as the end passage 20 and which has an inner end opening through the peripheral surface of the block member 12 in alinement with the inner end of the end passage 20. It is to be noted that the inner ends of the end passages 20 and 24 are disposed in longitudinally spaced relation.

Also lying in the longitudinal plane of the end passages 20 and 24 are intermediate passages 26 and 28. The intermediate passages 26 and 28 open through the peripheral surface of the block member 12 intermediate the inner ends of the end passages 20 and 24 with the inner ends of the intermediate passages 26 and 28 intersecting the inner ends of the end passages 20 and 24, respectively. It is to be noted that the inner ends of the passages 20, 24, 26 and 28 combine to form a first longitudinal groove 30 in the peripheral surface of the block member 12.

The intermediate passages 26 and 28 diverge from the longitudinal groove 30 and open through the opposite part of the peripheral surface of the block member 12 in longitudinally spaced relation. The outer ends of the intermediate passages 26 and 28 are connected together by a second longitudinal groove 32.

It is to be noted that inner end portions of the end passage 20 and the intermediate passage 26 are in overlapping relation so as to form a relatively sharp anchoring corner 34. Similarly, inner ends of the end passage 24 and the intermediate passage 28 are overlapping to form a relatively sharp anchoring corner 36. Disposed intermediate the intermediate passages 26 and 28 is a central web 38 which is generally triangular in cross section. At this time, it is pointed out that the passages 20, 24, 26 and 28 have central parts which are of a cross section generally corresponding to the particular cable or rope which is to be anchored within the stop block 10. However, outer parts of the passages 20, 24, 26 and 28 are enlarged to facilitate the movement of the cable, rope or the like therethrough. At this time, it is also pointed out that the stop block 10 is symmetrical about a central transverse axis.

The block member 12 may be formed of any desired material, although it should be light in weight. For example, the block member 12 may be formed of wood or plastic, or may be formed of a light weight metal, such as aluminum. In most events, it will be desired to reinforce the block member 12 by reinforcing bands, such as the bands 40 which will be secured in place by suitable fasteners 42.

Referring now to Figure 2 in particular, it will be seen that the stop block 10 is illustrated as being positioned on an electrical cable 44. The electrical cable 44 is passed through the passages 20, 26, 28 and 24 in sequence and has intermediate portions thereof anchored on the anchoring corners 34 and 36 with that portion of the cable between the intermediate portions being looped about the web 38. Thus the stop block 10 is fixedly positioned on the electrical cable 44.

Illustrated in Figure 1 schematically is a mine car 46 which includes a reel 48 for the electrical cable 44. Carried by the upper part of the mine car 46 is a guide 50 which includes an insulating insert 52 which is normally formed of porcelain. The electrical cable 44 passes through the insert 52 and the opposite end thereof is provided with a fitting (not shown) for attachment to an overhead wire so that power may be obtained for the mine car 46. It is desired that the stop block 10 be placed on the cable 44 in a position for engaging the porcelain eye 52, as is best shown in Fig. 2, so that the end of the cable 44 may remain slack and facilitate the attachment of the fitting to the overhead wire. By merely sliding the electrical cable through the block 10, and positioning the block 10 on the electrical cable 44 at the proper point, it will be readily apparent that the stop block 10 will form a suitable stop for the electrical cable 44 and that such stop will not shift with respect to the electrical cable and will require no attention whatsoever after it has been positioned.

While the stop block 10 has been illustrated and described with respect to an electrical cable for use on a mine car, it is to be understood that the uses thereof are not so limited. The stop block 10 may be used on any electrical cable, rope or the like for numerous purposes. Further, if smaller size cable or rope are passed through the stop block 10, the stop block 10 may be used for the purpose of splicing together ends thereof. Other uses of the invention will become readily apparent as the situation may arise.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A stop block for use with electric cable, rope and the like, said stop block comprising a one piece block member having centrally disposed entrance openings in opposite ends thereof, said block member having a longitudinal axis passing through the centers of said entrance openings, end passages disposed in a plane passing through said longitudinal axis and extending inwardly from said entrance openings in opposed relation, said end passages being disposed at angles to said longitudinal axis and in converging relation, said block member having a peripheral surface, inner ends of said end passages opening through said peripheral surface in longitudinally spaced relation, a first longitudinal groove in said peripheral surface interconnecting said inner ends, intermediate passages disposed in said longitudinal plane and extending transversely of said block member, said intermediate passages opening into said longitudinal groove intermediate said inner ends and extending therefrom in diverging relation, said intermediate passages having outer ends disposed in spaced relation, a second longitudinal groove in said peripheral surface connecting together said outer ends.

2. A stop block for use with electric cable, rope and the like, said stop block comprising a block member having centrally disposed entrance openings in opposite ends thereof, said block member having a longitudinal axis passing through the centers of said entrance openings, end passages disposed in a plane passing through said longitudinal axis and extending inwardly from said entrance openings in opposed relation, said end passages being disposed at angles to said longitudinal axis and in converging relation, said block member having a peripheral surface, inner ends of said end passages opening through said peripheral surface in longitudinally spaced relation, a first longitudinal groove in said peripheral surface interconnecting said inner ends, intermediate passages disposed in said longitudinal plane and extending transversely of said block member, said intermediate passages opening into said longitudinal groove intermediate said inner ends and extending therefrom in diverging relation, said intermediate passages having outer ends disposed in spaced relation, a second longitudinal groove in said peripheral surface connecting together said outer ends, portions of adjacent ones of said end passages and said intermediate passages intersecting to form relatively sharp anchoring corners.

3. A stop block for use with electric cable, rope and the like, said stop block comprising a block member having centrally disposed entrance openings in opposite ends thereof, said block member having a longitudinal axis passing through the centers of said entrance openings, end passages disposed in a plane passing through said longitudinal axis and extending inwardly from said entrance openings in opposed relation, said end passages being disposed at angles to said longitudinal axis and in converging relation, said block member having a peripheral surface, inner ends of said end passages opening through said peripheral surface in longitudinally spaced relation, a first longitudinal groove in said peripheral surface interconnecting said inner ends, intermediate passages disposed in said longitudinal plane and extending transversely of said block member, said intermediate passages opening into said longitudinal groove intermediate said inner ends and extending therefrom in diverging relation, said intermediate passages having outer ends disposed in spaced relation, a second longitudinal groove in said peripheral surface connecting together said outer ends, portions of adjacent ones of said end passages and said intermediate passages intersecting to form relatively sharp anchoring corners, said block member including a central web intermediate said intermediate passages, said central web being generally triangular in cross section.

4. A stop block for use with electric cable, rope and the like, said stop block comprising a block member having centrally disposed entrance openings in opposite ends thereof, said block member having a longitudinal axis passing through the centers of said entrance openings, end passages disposed in a plane passing through said longitudinal axis and extending inwardly from said entrance openings in opposed relation, said end passages being disposed at angles to said longitudinal axis and in converging relation, said block member having a peripheral surface, inner ends of said end passages opening through said peripheral surface in longitudinally spaced relation, a first longitudinal groove in said peripheral surface interconnecting said inner ends, intermediate passages disposed in said longitudinal plane and extending transversely of said block member, said intermediate passages opening into said longitudinal groove intermediate said inner ends and extending therefrom in diverging relation, said intermediate passages having outer ends disposed in spaced relation, a second longitudinal groove in said peripheral surface connecting together said outer ends, portions of adjacent ones of said end passages and said intermediate passages intersecting to form relatively sharp anchoring corners, said block member being symmetrical about a central transverse plane.

5. A stop block for use with electric cable, rope and the like, said stop block comprising a block member having centrally disposed entrance openings in opposite ends thereof, said block member having a longitudinal axis passing through the centers of said entrance openings, end passages disposed in a plane passing through said longitudinal axis and extending inwardly from said entrance openings in opposed relation, said end passages being disposed at angles to said longitudinal axis and in converging relation, said block member having a peripheral surface, inner ends of said end passages opening through said peripheral surface in longitudinally spaced relation, a first longitudinal groove in said peripheral surface interconnecting said inner ends, intermediate passages disposed in said longitudinal plane and extending transversely of said block member, said intermediate passages opening into said longitudinal groove intermediate said inner ends and extending therefrom in diverging relation, said intermediate passages having outer ends disposed in spaced relation, a second longitudinal groove in said peripheral surface connecting together said outer ends, portions of adjacent ones of said end passages and said intermediate passages intersecting to form relatively sharp anchoring corners, said first longitudinal groove being formed by ends of said end passages and said intermediate passages.

References Cited in the file of this patent
UNITED STATES PATENTS

| | | |
|---|---|---|
| 219,434 | Barron | Sept. 9, 1879 |
| 295,527 | Downie | Mar. 25, 1884 |
| 784,864 | Landis | Mar. 14, 1905 |
| 933,685 | Wray | Sept. 7, 1909 |
| 947,111 | Lorentz | Jan. 18, 1910 |